US012389381B2

(12) United States Patent
Gao et al.

(10) Patent No.: US 12,389,381 B2
(45) Date of Patent: Aug. 12, 2025

(54) COMMUNICATION METHOD AND COMMUNICATION DEVICE

(71) Applicant: Huawei Technologies Co., Ltd., Shenzhen (CN)

(72) Inventors: Lei Gao, Beijing (CN); Jiezuo Zhu, Beijing (CN); Xingqing Cheng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 448 days.

(21) Appl. No.: 18/050,786

(22) Filed: Oct. 28, 2022

(65) Prior Publication Data

US 2023/0083596 A1 Mar. 16, 2023

Related U.S. Application Data

(63) Continuation of application No. PCT/CN2020/087745, filed on Apr. 29, 2020.

(51) Int. Cl.
*H04W 72/0446* (2023.01)
*H04L 5/00* (2006.01)

(52) U.S. Cl.
CPC ....... *H04W 72/0446* (2013.01); *H04L 5/0044* (2013.01)

(58) Field of Classification Search
CPC ......... H04W 72/0446; H04W 72/1263; H04W 4/48; H04L 5/0044
See application file for complete search history.

(56) References Cited

U.S. PATENT DOCUMENTS

| | | | |
|---|---|---|---|
| 2015/0111610 A1 | 4/2015 | Hwang et al. | |
| 2018/0123755 A1* | 5/2018 | Kim | H04B 7/0617 |
| 2018/0249404 A1 | 8/2018 | Kumabe et al. | |
| 2018/0343632 A1* | 11/2018 | Lee | H04W 76/14 |
| 2019/0037597 A1 | 1/2019 | Lee et al. | |
| 2020/0119996 A1 | 4/2020 | Liu et al. | |
| 2020/0204968 A1* | 6/2020 | Lee | H04W 72/23 |
| 2020/0213161 A1* | 7/2020 | Zhang | H04W 80/08 |
| 2020/0221462 A1 | 7/2020 | Tang | |
| 2020/0252940 A1 | 8/2020 | Xiang et al. | |
| 2020/0281015 A1 | 9/2020 | Li et al. | |
| 2020/0288479 A1* | 9/2020 | Xi | H04L 5/0092 |
| 2020/0344031 A1 | 10/2020 | Shao et al. | |
| 2020/0403677 A1* | 12/2020 | Wu | H04W 72/1263 |
| 2020/0403678 A1* | 12/2020 | Shi | H04W 72/1263 |

(Continued)

FOREIGN PATENT DOCUMENTS

| | | |
|---|---|---|
| CN | 105659682 A | 6/2016 |
| CN | 106455115 A | 2/2017 |
| CN | 102625457 B | 1/2018 |

(Continued)

*Primary Examiner* — Syed Ali
(74) *Attorney, Agent, or Firm* — Conley Rose, P, C,

(57) ABSTRACT

A communication method includes jointly sending first data to a first communication device in n first time domain resources, where the n first time domain resources respectively belong to n first time units, where relative positions of the n first time domain resources in the n first time units are the same, where n is an integer greater than or equal to 2, where the n first time domain resources are included in a second time domain resource, and where the second time domain resource is a first periodic resource.

15 Claims, 6 Drawing Sheets

(56) References Cited

U.S. PATENT DOCUMENTS

2021/0235404 A1   7/2021   Li et al.

FOREIGN PATENT DOCUMENTS

| CN | 109152008 A | 1/2019 |
| CN | 109155728 A | 1/2019 |
| CN | 109379782 A | 2/2019 |
| CN | 109587798 A | 4/2019 |
| CN | 109788453 A | 5/2019 |
| CN | 110034864 A | 7/2019 |
| CN | 110740513 A | 1/2020 |
| CN | 111010737 A | 4/2020 |
| EP | 3624524 A1 | 3/2020 |
| JP | 2017046181 A | 3/2017 |
| KR | 20190072628 A | 6/2019 |
| WO | 2015018000 A1 | 2/2015 |
| WO | 2019095332 A1 | 5/2019 |

\* cited by examiner

COMMUNICATION METHOD AND COMMUNICATION DEVICE

CROSS-REFERENCE TO RELATED APPLICATIONS

This is a continuation of International Patent Application No. PCT/CN2020/087745 filed on Apr. 29, 2020, which is hereby incorporated by reference in its entirety.

TECHNICAL FIELD

This application relates to the field of wireless communication technologies, and in particular, to a communication method, a communication device, and a system, and is particularly applicable to short-range wireless communication, for example, cockpit domain communication.

BACKGROUND

Global communication technologies are evolving rapidly. The development speed and application fields of wireless communication technologies have surpassed those of wired communication technologies, showing a vigorous development trend. For example, development and application of in-vehicle communication technologies attract more and more attention from people. Compared with the existing wired communication, in-vehicle wireless communication can further reduce a quantity, length, and weight of internal wiring harnesses of a vehicle, and corresponding installation and maintenance costs. Therefore, the in-vehicle communication technologies are gradually becoming wireless. Diversification of in-vehicle applications leads to increasing quantities and types of in-vehicle communication nodes, and imposes a higher requirement on in-vehicle communication capabilities.

In many wireless communication scenarios, a plurality of communication nodes communicate with each other by communication domain. There may be one or more communication domains in a specific communication area or range. The communication domain is a system including a group of communication nodes that have a communication relationship, and a communication connection relationship (that is, a communication link) between the communication nodes. One communication domain includes one primary communication node (which may be referred to as a primary node for short) and at least one secondary communication node (which may be referred to as a secondary node for short). The primary node manages time-frequency resources of the communication domain, and has a function of scheduling resources for the communication link between the primary and secondary nodes.

How to transmit data packets with a large data volume becomes an urgent problem to be resolved.

SUMMARY

Embodiments of this application provide a communication method and a communication device, to transmit data packets with a large data volume.

According to a first aspect, a communication method is provided, and is used for signal transmission between a secondary node and a primary node. The method may be performed by the secondary node or the primary node, or the method may be performed by a chip or an integrated circuit configured on a secondary node or a primary node. This is not limited in this application. The primary node manages the secondary node and has a resource allocation function. The primary node is responsible for allocating a resource to the secondary node. The secondary node follows scheduling performed by the primary node and uses the resource allocated by the primary node to communicate with the primary node. The method includes jointly sending first data to a first communication device in n first time domain resources, where the n first time domain resources respectively belong to n first time units, relative positions of the n first time domain resources in the n first time units are the same, n is an integer greater than or equal to 2, the n first time domain resources are included in a second time domain resource, and the second time domain resource is a first periodic resource.

In this embodiment of this application, the first time unit may be a transmission granularity or a scheduling unit of a service, for example, another scheduling granularity, for example, a subframe, a frame, a slot, or a mini-slot. The first time units are consecutive time domain resources in time domain. The first time unit and duration of the first time domain resource may be predefined.

When a data volume of the first data cannot be completely transmitted on resources in one first time unit, the first data may be jointly sent in the n first time domain resources. The n first time domain resources respectively belong to the n first time units, and the n first time domain resources are inconsecutive in time domain. The n first time domain resources are all or a part of the periodic second time domain resource. A part of the first data is transmitted on each of the n first time domain resources. No header needs to be separately added to the part of the first data transmitted on each first time domain resource. The data transmitted in the n first time domain resources includes only one header. This can reduce extra overheads caused by the header, to improve resource utilization and transmission efficiency. In addition, a design of the data volume of the first data is not limited by a resource size, and data packets with a larger data volume may be sent.

In a possible implementation, the second time domain resource includes m first time domain resources and at least one third time domain resource, the m first time domain resources and the at least one third time domain resource are inconsecutive in time domain, m is an integer greater than or equal to 2, and n is less than or equal to m. The first time domain resource and the third time domain resource are used for data transmission in different directions. For example, the first time domain resource is used for uplink transmission, and the third time domain resource is used for downlink transmission, or the first time domain resource is used for downlink transmission, and the third time domain resource is used for uplink transmission.

In a possible implementation, the first time domain resource includes a first time domain sub-resource and a guard interval in time domain, and the jointly sending first data to a first communication device in n first time domain resources includes jointly sending the first data to the first communication device in n first time domain sub-resources. The guard interval may be used by the primary node and the secondary node to perform receiving and sending conversion or sending and receiving conversion, to prevent signal sending or receiving from being affected by unstable transmit power or receive gain in a conversion process. This improves quality of service transmission.

In a possible implementation, a periodicity length of the first periodic resource is N times a length of the first time unit, and N is an integer greater than or equal to 1. The first time domain resource or the third time domain resource is configured in each first time unit for joint sending such that data transmission efficiency can be improved.

In a possible implementation, the first data is at least one of higher layer signaling, physical layer signaling, or service data. In addition to the first data, a noise reduction service, another service, or the like may also be transmitted in the first time unit. Transmission of the first data occupies the first time domain resource in the first time unit, and does not affect transmission of the noise reduction service or another service.

According to a second aspect, a communication method is provided, and is used for signal transmission between a secondary node and a primary node. The method may be performed by the secondary node or the primary node, or the method may be performed by a chip or an integrated circuit configured on a secondary node or a primary node. This is not limited in this application. The primary node manages the secondary node and has a resource allocation function. The primary node is responsible for allocating a resource to the secondary node. The secondary node follows scheduling performed by the primary node and uses the resource allocated by the primary node to communicate with the primary node. The method includes: jointly receiving first data from a second communication device in n first time domain resources, where the n first time domain resources respectively belong to n first time units, relative positions of the n first time domain resources in the n first time units are the same, n is an integer greater than or equal to 2, the n first time domain resources are included in a second time domain resource, and the second time domain resource is a first periodic resource.

A part of the first data is transmitted on each of the n first time domain resources, no header needs to be separately added to the part of the first data transmitted on each first time domain resource, and the data transmitted in the n first time domain resources includes only one header. The part of the first data transmitted on each first time domain resource is not separately decoded, and the data transmitted in the n first time domain resources are jointly decoded. In this way, extra overheads caused by the header are reduced, to improve resource utilization and transmission efficiency, and data packets with a larger data volume may also be received, to improve transmission reliability and transmission efficiency.

In a possible implementation, the second time domain resource includes m first time domain resources and at least one third time domain resource, the m first time domain resources and the at least one third time domain resource are inconsecutive in time domain, m is an integer greater than or equal to 2, and n is less than or equal to m.

In a possible implementation, the first time domain resource includes a first time domain sub-resource and a guard interval in time domain, and the jointly receiving first data from a second communication device in n first time domain resources includes: jointly receiving the first data from the second communication device in n first time domain sub-resources.

In a possible implementation, a periodicity length of the first periodic resource is N times a length of the first time unit, and N is an integer greater than or equal to 1.

In a possible implementation, the first data is at least one of higher layer signaling, physical layer signaling, or service data.

For technical effects brought by the second aspect or the possible implementations of the second aspect, refer to the descriptions of the technical effects of the first aspect or the implementations of the first aspect. Details are not described again.

According to a third aspect, a communication device is provided, including a transceiver module. The transceiver module is configured to jointly send first data to a first communication device in n first time domain resources. The n first time domain resources respectively belong to n first time units, relative positions of the n first time domain resources in the n first time units are the same, n is an integer greater than or equal to 2, the n first time domain resources are included in a second time domain resource, and the second time domain resource is a first periodic resource.

In a possible implementation, the second time domain resource includes m first time domain resources and at least one third time domain resource, the m first time domain resources and the at least one third time domain resource are inconsecutive in time domain, m is an integer greater than or equal to 2, and n is less than or equal to m.

In a possible implementation, the first time domain resource includes a first time domain sub-resource and a guard interval in time domain, and that the transceiver module is configured to jointly send first data to a first communication device inn first time domain resources includes: The transceiver module is configured to jointly send the first data to the first communication device in n first time domain sub-resources.

In a possible implementation, a periodicity length of the first periodic resource is N times a length of the first time unit, and N is an integer greater than or equal to 1.

In a possible implementation, the first data is at least one of higher layer signaling, physical layer signaling, or service data.

For technical effects brought by the third aspect or the implementations of the third aspect, refer to the descriptions of the technical effects of the first aspect or the implementations of the first aspect. Details are not described again.

According to a fourth aspect, a communication device is provided, including a transceiver module. The transceiver module is configured to jointly receive first data from a second communication device in n first time domain resources. The n first time domain resources respectively belong to n first time units, relative positions of the n first time domain resources in the n first time units are the same, n is an integer greater than or equal to 2, the n first time domain resources are included in a second time domain resource, and the second time domain resource is a first periodic resource.

In a possible implementation, the second time domain resource includes m first time domain resources and at least one third time domain resource, the m first time domain resources and the at least one third time domain resource are inconsecutive in time domain, m is an integer greater than or equal to 2, and n is less than or equal to m.

In a possible implementation, the first time domain resource includes a first time domain sub-resource and a guard interval in time domain, and the jointly receiving first data from a second communication device in n first time domain resources includes jointly receiving the first data from the second communication device in n first time domain sub-resources.

In a possible implementation, a periodicity length of the first periodic resource is N times a length of the first time unit, and N is an integer greater than or equal to 1.

In a possible implementation, the first data is at least one of higher layer signaling, physical layer signaling, or service data.

For technical effects brought by the fourth aspect or the implementations of the fourth aspect, refer to the descriptions of the technical effects of the first aspect or the implementations of the first aspect. Details are not described again.

According to a fifth aspect, a communication apparatus is provided, including a processor and a memory. The memory is configured to store one or more programs, and the one or more programs include computer-executable instructions. When the apparatus is operating, the processor executes the one or more programs stored in the memory, to enable the apparatus to perform the method according to the first aspect or the possible implementations of the first aspect.

According to a sixth aspect, a communication apparatus is provided, including a processor and a memory. The memory is configured to store one or more programs, and the one or more programs include computer-executable instructions. When the apparatus is operating, the processor executes the one or more programs stored in the memory, to enable the apparatus to perform the method according to the second aspect or the possible implementations of the second aspect.

According to a seventh aspect, an embodiment of this application further provides a computer-readable storage medium. The computer storage medium stores a computer program. When the computer program is run on a computer, the computer is enabled to perform the method according to the first aspect, the second aspect, the implementations of the first aspect, or the implementations of the second aspect.

According to an eighth aspect, an embodiment of this application further provides a computer program product. The computer program product includes a computer program, and when the computer program is run on a computer, the computer is enabled to perform the method according to the first aspect, the second aspect, the implementations of the first aspect, or the implementations of the second aspect.

According to a ninth aspect, an embodiment of this application provides a chip. The chip includes a processor and a communication interface. The processor is configured to invoke instructions from the communication interface and run the instructions. When the processor executes the instructions, the chip is enabled to perform the method according to the first aspect, the second aspect, the implementations of the first aspect, or the implementations of the second aspect.

According to a tenth aspect, an embodiment of this application provides a system. The system includes the communication apparatus according to the third aspect or the fifth aspect, the communication apparatus according to the fourth aspect or the sixth aspect, or the chip according to the ninth aspect.

BRIEF DESCRIPTION OF DRAWINGS

To describe the technical solutions in embodiments of the present disclosure more clearly, the following briefly introduces the accompanying drawings for describing embodiments of the present disclosure. It is clear that the accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
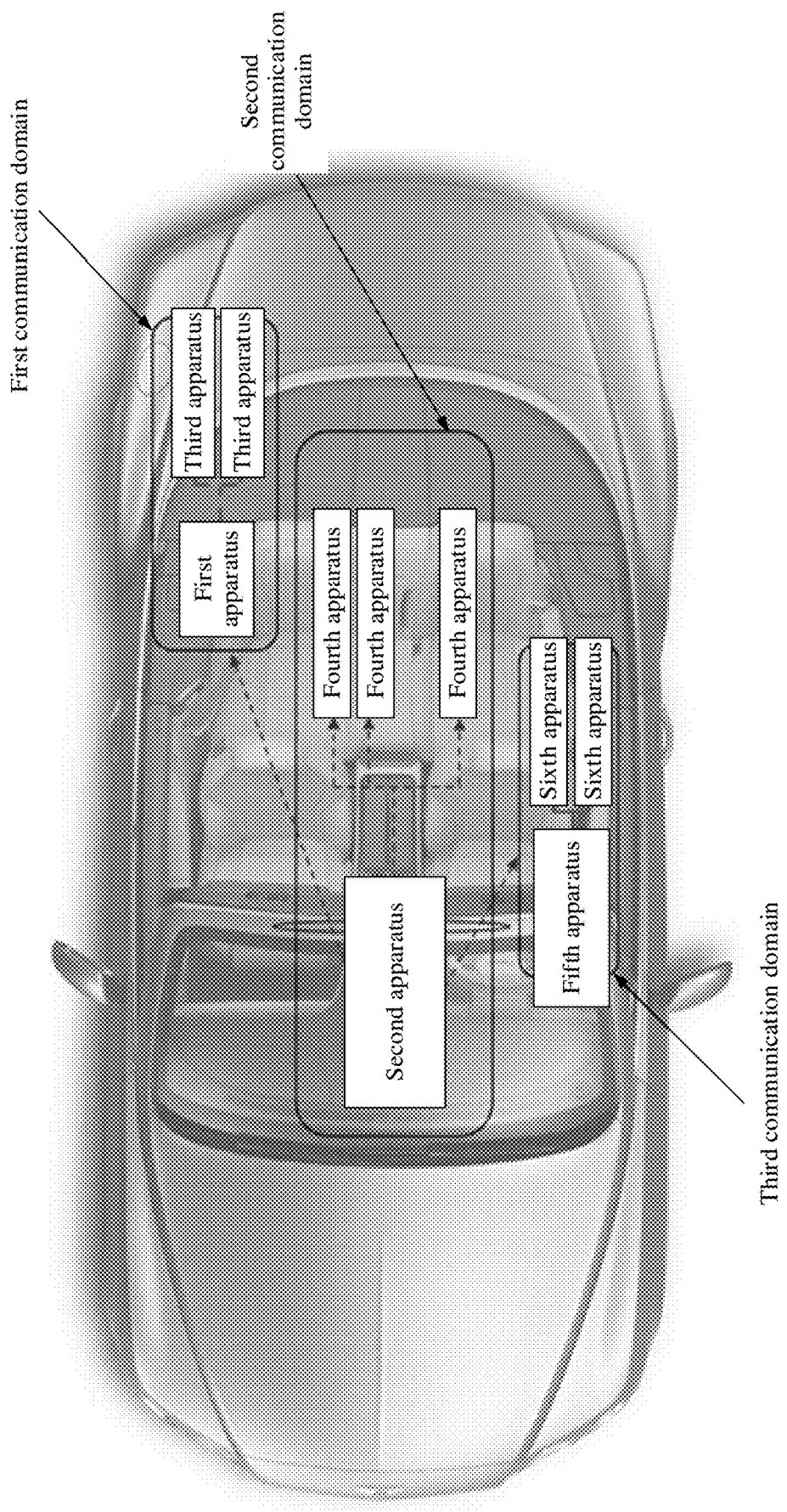
FIG. 1 is a schematic diagram of a scenario architecture of a communication method according to an embodiment of this application.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that embodiments of this application described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, product, or device.

A communication device in embodiments of this application may be an in-vehicle device, for example, a head unit, an in-vehicle speaker, or an in-vehicle microphone, or may be an electronic device, for example, a mobile phone, a tablet computer, a desktop computer, a laptop computer, a notebook computer, an ultra-mobile personal computer (UMPC), a handheld computer, a netbook, a personal digital assistant (PDA), a wearable electronic device, or a virtual reality device.

The following first explains some terms in this application to facilitate understanding by a person skilled in the art.

(1) Cockpit domain controller or a control domain cockpit (CDC) is referred to as a head unit. In addition to conventional radio, music and video playing, and navigation functions, the control domain cockpit has a cellular communication function (third generation (3G), fourth generation (4G), and the like). The control domain cockpit can work with an automobile Controller Area Network (CAN)—bus technology to implement information communication between a person and a vehicle and between a vehicle and the outside world such that user experience and functions related to a service and security are enhanced.

(2) A primary node and a secondary node refer to two types of nodes distinguished based on logical functions. The primary node manages the secondary node and has a resource allocation function. The primary node is responsible for allocating a resource to the secondary node. The secondary node follows scheduling performed by the primary node and uses the resource allocated by the primary node to communicate with the primary node. The nodes may be various apparatuses. For example, the primary node is a mobile phone, the primary node is a headset. The mobile phone establishes a communication connection to the headset to implement data exchange. The mobile phone manages the headset. The mobile phone has a resource allocation function, and may allocate resources to the headset.

(3) A communication domain is a system including a group of communication nodes that have a communication relationship, and a communication connection relationship between the communication nodes. One apparatus or device may be in a plurality of communication domains. For example, when a mobile phone performs wireless communication with a headset, the mobile phone is in a communication domain a including the mobile phone and the headset. In the communication domain a, the mobile phone is a primary node, and the headset is a secondary node. Then, after the mobile phone detects a CDC and establishes a wireless connection to the CDC, the mobile phone is also in a communication domain b including the mobile phone and the CDC. In the communication domain b, the CDC is a primary node, and the mobile phone is a secondary node. In this case, the mobile phone follows scheduling of the CDC. The communication domain b may further include other secondary nodes such as an in-vehicle sound box and a microphone.

A wireless communication scenario to which the communication method provided in embodiments of this application is applied may include wide area wireless communication, for example, communication between a plurality of base stations and a plurality of user equipments (UEs). The base station serves as a primary node, the UE serves as a secondary node, the base station allocates a resource to the UE, and the UE follows scheduling of the base station. Alternatively, the wireless communication scenario may include an in-vehicle wireless communication scenario, for example, communication between a CDC and each of an in-vehicle sound box, an in-vehicle microphone, and a mobile phone, and communication between the mobile phone and a wearable device such as a headset. Alternatively, the wireless communication scenario may include wireless local area communication, for example, communication between a plurality of access points (APs) and a plurality of stations.

To better understand the communication method in embodiments of this application, the following uses an in-vehicle wireless communication scenario as an example for description. However, the communication method in embodiments of this application is not limited to be applied to the in-vehicle communication scenario.

FIG. 1 is a schematic diagram of a scenario architecture of a communication method according to an embodiment of this application. The scenario architecture may include but is not limited to a first apparatus, a second apparatus, a third apparatus, and a fourth apparatus. The first apparatus may be a mobile phone. The second apparatus may be a CDC. The third apparatus may include a plurality of wearable devices such as a headset and a band. The fourth apparatus may also include a plurality of devices such as an in-vehicle sound box and an in-vehicle microphone. It can be learned from the foregoing that the first apparatus is different from the second apparatus. In some possible scenarios, the first apparatus and the second apparatus may be of a same type. For example, both the first apparatus and the second apparatus are CDCs, but the first apparatus and the second apparatus are different CDCs.

The second apparatus may be a device in an in-vehicle wireless communication scenario that performs control and management such as allocation and coordination on a communication resource. The second apparatus establishes a communication connection to at least one fourth apparatus to form a second communication domain. The first apparatus establishes a communication connection to at least one third apparatus to form a first communication domain.

In a possible implementation, the scenario architecture in this embodiment of this application may further include a communication domain formed by more apparatuses, for example, a fifth apparatus and a sixth apparatus. This is not limited in this application.

In actual application, in-vehicle applications are diversified, and there are a large quantity and various types of in-vehicle communication nodes. Services in in-vehicle communication include a noise reduction service, a dynamic service, and other services. The noise reduction service includes uplink transmission and downlink transmission, and is used to cancel air noise, tire noise, and the like. The noise reduction service mainly includes ultra-small-packet data, for example, data of 16 bits or 32 bits. The noise reduction service is strongly periodic and has a very short periodicity. The dynamic service has a small service volume, is non-periodic, and does not have a high requirement for delay. For example, the dynamic service reports information about an operation button, or reports an abnormal working status of a device. The other services include a common audio/video service, a web browsing service, a file transfer service, and the like. A large volume of data is transmitted each time, and transmission duration is long. Therefore, when a service of a data packet cannot be completely transmitted in one scheduling granularity, how to transmit data packets with a large data volume becomes an urgent problem to be resolved.

Based on this, this application provides a communication method. First data is jointly sent in n first time domain resources, a part of the first data is transmitted on each of the n first time domain resources, no header needs to be separately added to the part of the first data transmitted on each first time domain resource, and the data transmitted in the n first time domain resources includes only one header. This can reduce additional overheads caused by the header, to improve resource utilization and transmission efficiency.

The following describes in detail embodiments provided in this application with reference to the accompanying drawings.

Figure 2:
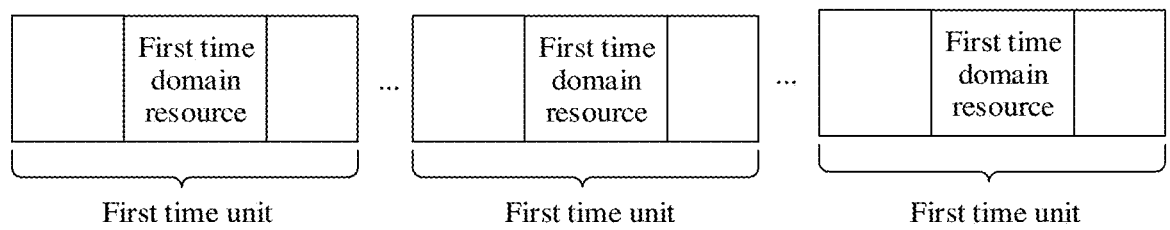
FIG. 2 is a schematic diagram of a structure of a time domain resource unit according to an embodiment of this application.

FIG. 2 is a schematic diagram of a structure of a time domain resource according to an embodiment of this application. As shown in FIG. 2, a first time unit includes a first time domain resource.

In a scenario in which a primary node performs downlink transmission to a secondary node, the primary node jointly sends first data to a first communication device in n first time domain resources, where the downlink transmission refers to sending by the primary node and receiving by the secondary node, and the first communication device is a secondary node. The secondary node jointly receives the first data from a second communication device in the n first time domain resources, where the second communication device is a primary node. The first time domain resource is used for downlink transmission.

In a scenario in which a secondary node performs uplink transmission to a primary node, the secondary node jointly sends first data to a first communication device in n first time domain resources, where the uplink transmission refers to sending by the secondary node and receiving by the primary node, and the first communication device is a primary node. The primary node jointly receives the first data from a second communication device in the n first time domain resources, where the second communication device is a secondary node. The first time domain resource is used for uplink transmission.

The n first time domain resources respectively belong to n first time units, relative positions of the n first time domain resources in the n first time units are the same, and n is an integer greater than or equal to 2. The n first time domain resources are included in a second time domain resource, and the second time domain resource is a first periodic resource.

As described above, the first time domain resource may be used for uplink transmission or downlink transmission. This is not limited herein. The following uses a case in which the first time domain resource is used for uplink transmission as an example for description. The n first time domain resources respectively belong to the n first time units, and the n first time units may be consecutive or inconsecutive in time domain. This is not limited herein. The first time unit may be a transmission granularity or a scheduling unit of a service, for example, another scheduling granularity, for example, a subframe, a frame, a slot, or a mini-slot. The first time units are consecutive time domain resources in time domain. A position of the first time domain resource in the first time unit is not limited. The first time domain resources are consecutive time domain resources in time domain. Alternatively, a quantity of symbols included in the first time unit may be predefined. The quantity of symbols included in the first time unit and a time length are not limited herein. The time length may be, for example, 1/(48 kilohertz (kHz))≈20.83 microseconds (μs).

The secondary node sends the first data in the n first time domain resources in the n first time units, where each first time unit includes one first time domain resource. That relative positions of the n first time domain resources in the n first time units are the same may be that positions of symbols in the n first time domain resources in all the first time units are the same. For example, the first time unit includes 10 symbols: the first symbol, the second symbol, . . . , and the tenth symbol. The first time domain resource may include the fourth symbol and the fifth symbol in the first time unit. The n first time domain resources include the fourth symbols and the fifth symbols in the n first time units.

The secondary node jointly sends the first data to the primary node in the n first time domain resources. A part of the first data is sent on each of the n first time domain resources, no header needs to be separately added to the part of the first data sent on each first time domain resource, and the data transmitted in the n first time domain resources includes only one header. This can reduce extra overheads caused by the header, to improve resource utilization and transmission efficiency. The primary node jointly receives the first data from the secondary node in the n first time domain resources, does not decode the part of the first data transmitted on each first time domain resource, and jointly decodes the data transmitted in the n first time domain resources. In this way, data packets with a larger data volume can be received. When a same resource is used for data transmission, transmission reliability of data packets with a larger data volume is higher. Under a condition of ensuring same transmission reliability, transmission efficiency of data packets with a larger data volume is higher.

Because the secondary node may jointly send the first data in the n first time domain resources, a data volume of the first data may be designed more flexibly, and transmission of a noise reduction service or another service is not affected.

The n first time domain resources are included in the second time domain resource, and the second time domain resource is a first periodic resource.

Figure 3:
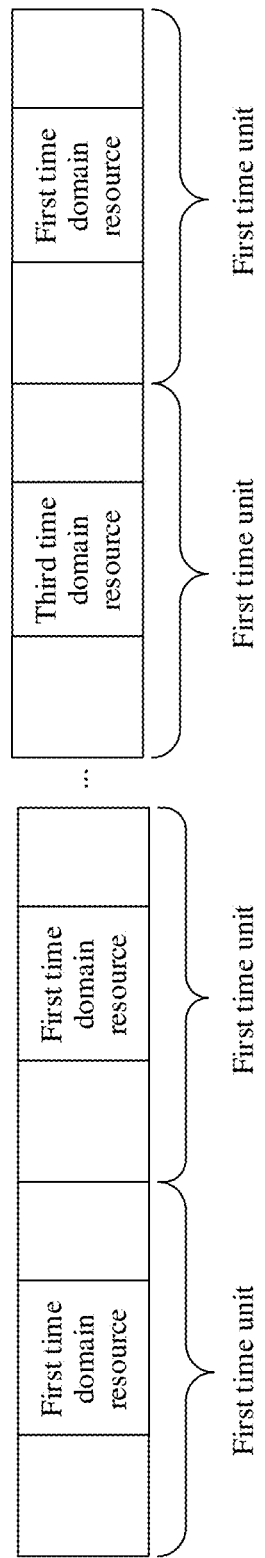
FIG. 3 is a schematic diagram of a structure of another time domain resource unit according to an embodiment of this application.

Optionally, the second time domain resource includes m first time domain resources and at least one third time domain resource, the m first time domain resources and the at least one third time domain resource are inconsecutive in time domain, m is an integer greater than or equal to 2, and n is less than or equal to m. As shown in FIG. 3, the second time domain resource includes m first time domain resources and p third time domain resources, and p is an integer greater than or equal to 1. The m first time domain resources and the p third time domain resources are respectively included in m first time units and p first time units. The m first time units and the p first time units are consecutive in time domain. A relative position of the third time domain resource in the first time unit is the same as a relative position of the first time domain resource in the first time unit. Explanations of the relative position herein are the same as those in the foregoing descriptions, and details are not described again. A time length of the third time domain resource is the same as a time length of the first time domain resource, and the first time domain resource and the third time domain resource are used for data transmission in different directions. For example, the first time domain resource is used for uplink transmission, and the third time domain resource is used for downlink transmission, or the first time domain resource is used for downlink transmission, and the third time domain resource is used for uplink transmission. A position relationship between the m first time units and the p first time units in time domain is not limited herein.

Figure 4:
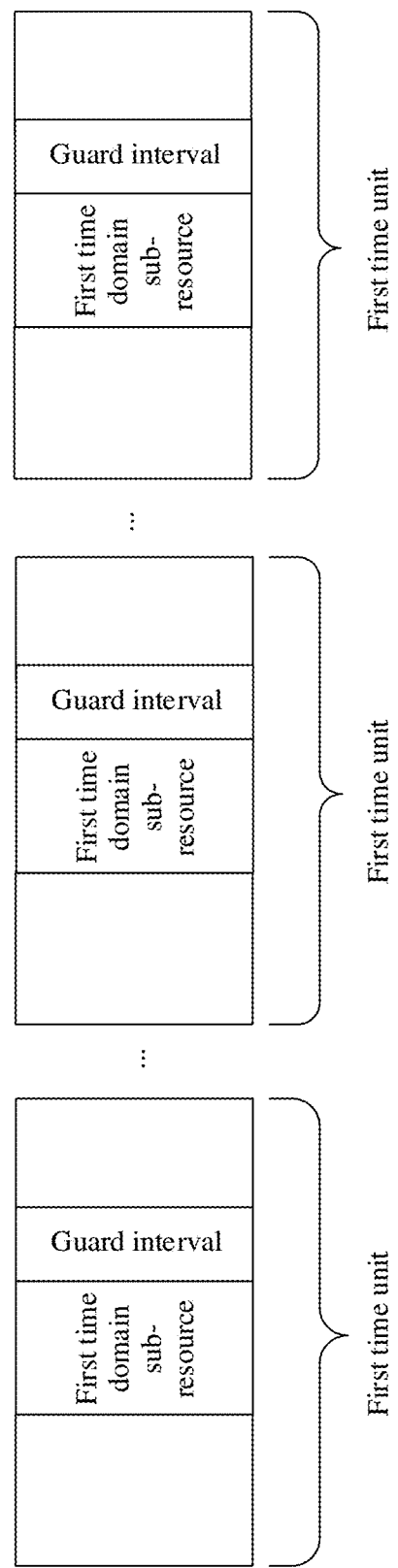
FIG. 4 is a schematic diagram of a structure of still another time domain resource unit according to an embodiment of this application.

Optionally, the first time domain resource includes a first time domain sub-resource and a guard interval in time domain. That the secondary node jointly sends first data to a first communication device in n first time domain resources includes: jointly sending the first data to the first communication device in n first time domain sub-resources. That the primary node jointly receives the first data from the secondary node in the n first time domain resources includes: The primary node jointly receives the first data from the secondary node in the n first time domain sub-resources. As shown in FIG. 4, the first time domain sub-resource and the guard interval are consecutive in time domain, and each of the first time domain sub-resource and the guard interval may occupy one symbol. The guard interval may be used by the primary node and the secondary node to perform receiving and sending conversion or sending and receiving conversion, to prevent signal sending or receiving from being affected by unstable transmit power or receive gain in a conversion process. This improves quality of service transmission.

Optionally, a periodicity length of the first periodic resource is N times a length of the first time unit, and N is an integer greater than or equal to 1. When N is 1, the second time domain resources are distributed in m+p first time units, relative positions of the second time domain resources in all the first time units are the same, and a periodicity of the second time domain resource is a length of one first time unit. The first time unit is a periodic resource in time domain, and a periodicity value of the first time unit is a length of the first time unit. When N is an integer greater than or equal to 1, a periodicity of the second time domain resource is N times the length of the first time unit. The second time domain resources may be evenly distributed in N*(m+p) first time units, N−1 first time units are between adjacent two first time units in either of which a first time domain resource or a third time domain resource is configured, and no second time domain resource is configured in the N−1 first time units.

Optionally, the first data is at least one of higher layer signaling, physical layer signaling, or service data. In addition to the first data, a noise reduction service, another service, or the like may also be transmitted in the first time unit. Transmission of the first data occupies the first time domain resource in the first time unit, and does not affect transmission of the noise reduction service or another service.

The method provided in embodiments of this application is described above in detail. The following describes in detail a communication device provided in embodiments of this application. It should be understood that descriptions of the embodiments of the communication device correspond to the descriptions of the method embodiments. Therefore, for content not described in detail, refer to the foregoing method embodiments. For brevity, details are not described herein again.

In embodiments of this application, the communication module may be divided into functional modules. For example, each functional module may be obtained through division based on each corresponding function, or two or more functions may be integrated into one functional module. The integrated module may be implemented in a form of hardware, or may be implemented in a form of a software functional module. It should be noted that, in embodiments of this application, module division is an example, and is merely a logical function division. In actual implementation, another division manner may be used.

Figure 5:
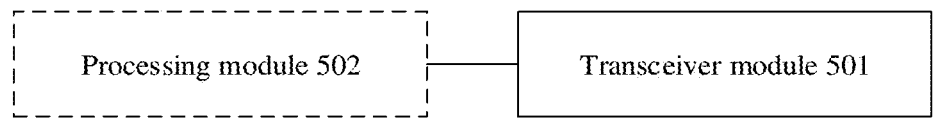
FIG. 5 is a schematic diagram of a structure of a communication device according to an embodiment of this application.

For example, when the functional modules of the communication device are obtained through division in an integrated manner. FIG. 5 is a schematic diagram of a possible structure of a communication device (secondary node) in the foregoing embodiments of this application. The communication device 5 may include a transceiver module 501, and optionally, may further include a processing module 502. The processing module 502 may be configured to perform all operations performed by the secondary node other than a sending operation and a receiving operation in the foregoing method embodiments and/or configured to support another process of the technology described in this specification. The transceiver module 501 may be configured to perform all transmission operations performed by the secondary node in the method embodiments, and/or configured to support another process of the technology described in this specification.

The transceiver module 501 is configured to jointly send first data to a first communication device in n first time domain resources. The n first time domain resources respectively belong to n first time units, relative positions of the n first time domain resources in the n first time units are the same, and n is an integer greater than or equal to 2.

The n first time domain resources are included in a second time domain resource, and the second time domain resource is a first periodic resource.

In a possible implementation, the second time domain resource includes m first time domain resources and at least one third time domain resource, the m first time domain resources and the at least one third time domain resource are inconsecutive in time domain, m is an integer greater than or equal to 2, and n is less than or equal to m.

In a possible implementation, the first time domain resource includes a first time domain sub-resource and a guard interval in time domain, and that the transceiver module is configured to jointly send first data to a first communication device inn first time domain resources includes:

The transceiver module is configured to jointly send the first data to the first communication device in n first time domain sub-resources.

In a possible implementation, a periodicity length of the first periodic resource is N times a length of the first time unit, and N is an integer greater than or equal to 1.

In a possible implementation, the first data is at least one of higher layer signaling, physical layer signaling, or service data.

Figure 6:
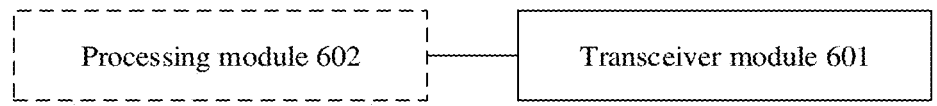
FIG. 6 is a schematic diagram of a structure of another communication device according to an embodiment of this application.

FIG. 6 is a schematic diagram of a possible structure of a communication device (primary node) in the foregoing embodiment of this application. The communication device 6 may include a transceiver module 601, and optionally, may further include a processing module 602. The processing module 602 may be configured to perform all operations performed by the primary node other than a sending operation and a receiving operation in the foregoing method embodiments and/or configured to support another process of the technology described in this specification. The transceiver module 601 may be configured to perform all transmission operations performed by the primary node in the method embodiments, and/or configured to support another process of the technology described in this specification.

The transceiver module 601 is configured to jointly receive first data from a second communication device in n first time domain resources. The n first time domain resources respectively belong to n first time units, relative positions of the n first time domain resources in the n first time units are the same, and n is an integer greater than or equal to 2. The n first time domain resources are included in a second time domain resource, and the second time domain resource is a first periodic resource.

In a possible implementation, the second time domain resource includes m first time domain resources and at least one third time domain resource, the m first time domain resources and the at least one third time domain resource are inconsecutive in time domain, m is an integer greater than or equal to 2, and n is less than or equal to m.

In a possible implementation, the first time domain resource includes a first time domain sub-resource and a guard interval in time domain, and that the transceiver module is configured to jointly receive first data from a second communication device in n first time domain resources includes jointly receiving the first data from the second communication device in n first time domain sub-resources.

In a possible implementation, a periodicity length of the first periodic resource is N times a length of the first time unit, and N is an integer greater than or equal to 1.

In a possible implementation, the first data is at least one of higher layer signaling, physical layer signaling, or service data.

Figure 7:
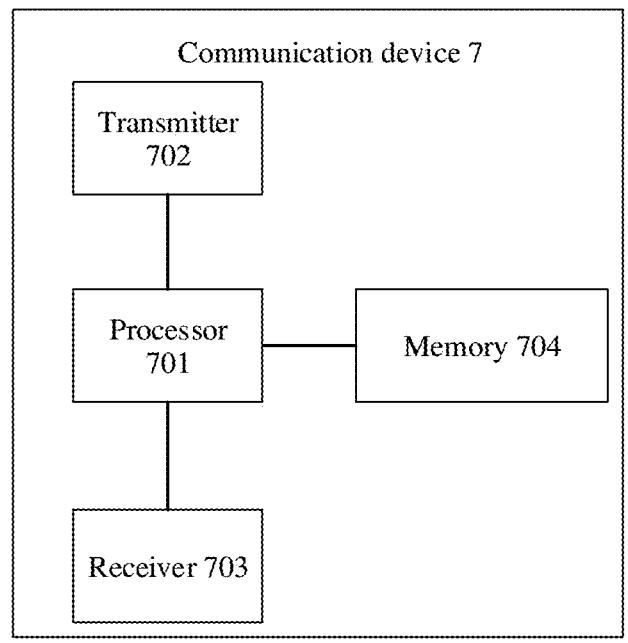
FIG. 7 is a schematic diagram of a structure of still another communication device according to an embodiment of this application.

FIG. 7 is a schematic diagram of another possible structure of a primary node or a secondary node according to an embodiment of this application. A communication device 7 may include at least one processor 701 and a transmitter 702. Functions of the processor 701 and the transmitter 702 may separately correspond to specific functions of the processing module 502 and the processing module 602 and the transceiver module 501 and the transceiver module 601 shown in FIG. 5 and FIG. 6. Details are not described herein again. Optionally, the communication device 7 may further include a memory 704, configured to store program instructions and/or data for the processor 701 to read.

Figure 8:
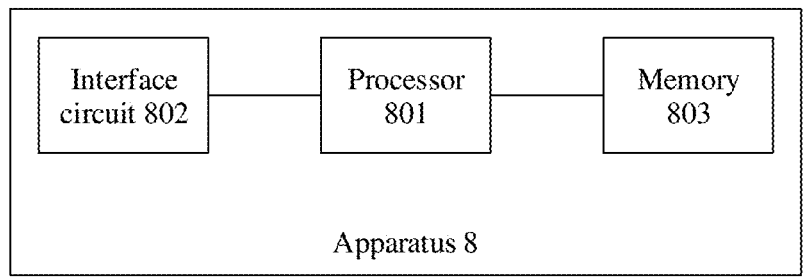
FIG. 8 is a schematic diagram of a structure of a chip according to an embodiment of this application.

FIG. 8 is a schematic diagram of a structure of an apparatus 8 according to an embodiment of this application. The apparatus 8 shown in FIG. 8 may be a primary node or a secondary node, or may be a chip or a circuit that can complete a function of a primary node or a secondary node. For example, the chip or the circuit may be disposed in the primary node or the secondary node. The apparatus 8 shown in FIG. 8 may include at least one processor 801 and an interface circuit 802. The processor 801 implements the steps in the method provided in the foregoing embodiments. Optionally, the apparatus 8 may further include a memory 803, and the memory 803 may be configured to store instructions. The processor 801 executes the instructions stored in the memory 803, to enable the apparatus 8 to implement the steps in the method provided in the foregoing method embodiments.

Further, the processor 801, the interface circuit 802, and the memory 803 may communicate with each other through an internal connection channel, to transfer control signals and/or data signals. The memory 803 is configured to store a computer program. The processor 801 may invoke the computer program from the memory 803 and run the computer program, to control the interface circuit 802 to receive signals or send signals, or the processor 801 invokes the computer program from the memory 803 by using the interface circuit 802 and runs the computer program, to complete the steps performed by the primary node, the secondary node in the method provided in the foregoing embodiments. The memory 803 may be integrated into the processor 801, or may be disposed separately from the processor 801.

Optionally, if the apparatus 8 is a device, the interface circuit 802 may include a receiver and a transmitter. The receiver and the transmitter may be a same component or different components. When the receiver and the transmitter are a same component, the component may be referred to as a transceiver.

Optionally, if the apparatus 8 is a chip or a circuit, the interface circuit 802 may include an input interface and an output interface. The input interface and the output interface may be a same interface, or may be different interfaces.

Optionally, if the apparatus 8 is a chip or a circuit, the apparatus 8 may not include the memory 803. The processor 801 may read instructions (programs or code) in an external memory of the chip or the circuit, to implement the steps in the method provided in the foregoing embodiments.

Optionally, if the apparatus 8 is a chip or a circuit, the apparatus 8 may include a resistor, a capacitor, or another corresponding functional unit, and the processor 801 or the interface circuit 802 may be implemented by using the corresponding functional unit.

In an implementation, a function of the interface circuit 802 may be considered to be implemented by using a transceiver circuit or a transceiver-dedicated chip. It may be considered that the processor 801 is implemented by a dedicated processing chip, a processing circuit, a processor, or a general-purpose chip.

In another implementation, it may be considered that the first apparatus provided in embodiments of this application is implemented by using a general-purpose computer. To be specific, program code for implementing functions of the processor 801 and the interface circuit 802 is stored in the memory 803, and the processor 801 implements the functions of the processor 801 and the interface circuit 802 by executing the program code stored in the memory 803.

Functions and actions of the modules or units in the apparatus 8 listed above are merely examples for description. Functional units in the apparatus 8 may be used for actions or processing processes performed by the primary node or the secondary node in the foregoing method embodiment. To avoid repetition, detailed descriptions are omitted herein.

An embodiment of this application further provides a system applied to unmanned driving or intelligent driving. The system includes at least one of a primary node or a secondary node that are mentioned in the foregoing embodiments of this application. The at least one apparatus in the system may be integrated into an entire system or a device, or the at least one apparatus in the system may be independently disposed as an element or an apparatus.

When being implemented by using software, the primary node or the secondary node may be implemented entirely or partially in a form of a computer program product. The computer program product includes one or more computer instructions. When the computer program instructions are loaded and executed on a computer, the procedure or functions according to embodiments of this application are all or partially implemented. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state disk (SSD)), or the like.

It should be noted that one or more processors may be included in the primary node, the secondary node A, or the secondary node B, and are configured to perform the communication method provided in embodiments of this application. The one or more processors may be a central processing unit (CPU), a general-purpose processor, a digital signal processor (DSP), an application-specific integrated circuit (ASIC), a field-programmable gate array (FPGA) or another programmable logic device, a transistor logic device, a hardware component, or any combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor. Alternatively, if the primary node, the secondary node A, or the secondary node B is a processing apparatus, the processing apparatus may be a CPU, a general-purpose processor, a DSP, an ASIC, an FPGA or another programmable logic device, a transistor logic device, a hardware component, or any combination thereof. The processor may implement or execute various example logical blocks, modules, and circuits described with reference to content disclosed in this application. The processing apparatus may be a combination of processors implementing a computing function, for example, a combination of one or more microprocessors, or a combination of the DSP and a microprocessor.

Method or algorithm steps described with reference to embodiments of this application may be implemented by hardware, or may be implemented by a processor by executing software instructions. The software instruction may include a corresponding software module, and the software module may be stored in a random-access memory (RAM), a flash memory, a read-only memory (ROM), an erasable programmable ROM (EPROM), an electrically EPROM (EEPROM), a register, a hard disk, a removable hard disk, a compact disc ROM (CD-ROM), or any other form of storage medium well known in the art. For example, a storage medium is coupled to a processor such that the processor can read information from the storage medium or write information into the storage medium. Certainly, the storage medium may be a component of the processor. The processor and the storage medium may be located in an ASIC. In addition, the ASIC may be located in a first apparatus. Certainly, the processor and the storage medium may exist in the primary node, the secondary node A, or the secondary node B as discrete components.

It may be understood that FIG. 5 to FIG. 8 show only simplified designs of the primary node, the secondary node A, or the secondary node B. In actual application, the primary node, the secondary node A, or the secondary node B may include any quantity of transmitters, receivers, processors, controllers, memories, and other possible elements.

The foregoing descriptions about implementations allow a person skilled in the art to clearly understand that, for the purpose of convenient and brief description, division of the foregoing functional modules is used as an example for illustration. In actual application, the foregoing functions can be allocated to different functional modules for implementation based on a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiments are merely examples. For example, the module or division into the units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on an actual requirement to achieve the objectives of the solutions of embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software functional unit and sold or used as an independent product, the integrated unit may be stored in a readable storage medium. Based on such an understanding, the technical solutions of embodiments of this application essentially, or the part contributing to the current technology, or all or some of the technical solutions may be implemented in the form of a software product. The software product is stored in a storage medium and includes several instructions for instructing a device (which may be a single-chip microcomputer, a chip, or the like) or a processor to perform all or some of the steps of the method described in embodiments of this application. The foregoing storage medium includes any medium that can store program code, such as a Universal Serial Bus (USB) flash drive, a removable hard disk, a ROM, a RAM, a magnetic disk, or an optical disc.

The foregoing descriptions are merely specific implementations of embodiments of this application, but are not intended to limit the protection scope of embodiments of this application. Any variation or replacement within the technical scope disclosed in this application shall fall within the protection scope of embodiments of this application. Therefore, the protection scope of embodiments of this application shall be subject to the protection scope of the claims.

What is claimed is:

1. A method comprising:
   jointly sending first data to a first communication device in n first time domain resources,
   wherein the n first time domain resources respectively belong to n first time units,
   wherein relative positions of the n first time domain resources in the n first time units are the same,
   wherein n is an integer greater than or equal to 2,
   wherein the n first time domain resources are comprised in a second time domain resource,
   wherein the second time domain resource is a first periodic resource,
   wherein the second time domain resource comprises m first time domain resources and at least one third time domain resource, wherein the m first time domain resources and the at least one third time domain resource are inconsecutive in a time domain, wherein m is an integer greater than or equal to 2, wherein n is less than or equal to m, wherein a periodicity length of the first periodic resource is N times a length of a first time unit of the n first time units, and wherein N is an integer greater than or equal to 1.

2. The method of claim 1, wherein a first time domain resource of the n first time domain resources comprises a first time domain sub-resource and a guard interval in time domain, wherein jointly sending the first data comprises sending a part of the first data on every one of the first time domain sub-resources, and wherein the first data includes only one header.

3. The method of claim 1, wherein the first data is at least one of higher layer signaling, physical layer signaling, or service data.

4. The method of claim 1, wherein a first time domain resource of the n first time domain resources is consecutive in a time domain.

5. The method of claim 1, wherein a first time domain resource of the n first time domain resources is for uplink transmission or downlink transmission.

6. The method of claim 1, wherein a first time unit of the n first time units is a frame.

7. A method comprising:
   jointly receiving first data from a first communication device in n first time domain resources, wherein the n first time domain resources respectively belong to n first time units, wherein relative positions of the n first time domain resources in the n first time units are the same, wherein n is an integer greater than or equal to 2, wherein the n first time domain resources are comprised in a second time domain resource, wherein the second time domain resource is a first periodic resource, wherein the second time domain resource comprises m first time domain resources and at least one third time domain resource, wherein the m first time domain resources and the at least one third time domain resource are inconsecutive in a time domain, wherein m is an integer greater than or equal to 2, wherein n is less than or equal to m, wherein a periodicity length of the first periodic resource is N times a length of a first time unit of the n first time units, and wherein N is an integer greater than or equal to 1.

8. The method of claim 7, wherein a first time domain resource of the n first time domain resources comprises a first time domain sub-resource and a guard interval in time domain, wherein jointly receiving the first data comprises receiving a part of the first data on every one of the first time domain sub-resources, and wherein the first data includes only one header.

9. The method of claim 7, wherein the first data is at least one of higher layer signaling, physical layer signaling, or service data.

10. An apparatus comprising:
a memory configured to store instructions; and
a processor coupled to the memory and configured to execute the instructions to cause the apparatus to:
jointly send first data to a first communication device in n first time domain resources, wherein the n first time domain resources respectively belong to n first time units, wherein relative positions of the n first time domain resources in the n first time units are the same, wherein n is an integer greater than or equal to 2, wherein the n first time domain resources are comprised in a second time domain resource, wherein the second time domain resource is a first periodic resource, wherein the second time domain resource comprises m first time domain resources and at least one third time domain resource, wherein the m first time domain resources and the at least one third time domain resource are inconsecutive in a time domain, wherein m is an integer greater than or equal to 2, wherein n is less than or equal to m, wherein a periodicity length of the first periodic resource is N times a length of a first time unit of the n first time units, and wherein N is an integer greater than or equal to 1.

11. The apparatus of claim 10, wherein a first time domain resource of the n first time domain resources comprises a first time domain sub-resource and a guard interval in time domain, wherein the processor is further configured to send a part of the first data on every one of the first time domain sub-resources, and wherein the first data includes only one header.

12. The apparatus of claim 10, wherein the first data is at least one of higher layer signaling, physical layer signaling, or service data.

13. The apparatus of claim 10, wherein a first time domain resource of the n first time domain resources is consecutive in a time domain.

14. The apparatus of claim 10, wherein a first time domain resource of the n first time domain resources is for uplink transmission or downlink transmission.

15. The apparatus of claim 10, wherein a first time unit of the n first time units is a frame.

* * * * *